US012179330B2

(12) United States Patent
Cambruzzi et al.

(10) Patent No.: US 12,179,330 B2
(45) Date of Patent: Dec. 31, 2024

(54) SETTING TOOL AND METHOD FOR PERCUSSIVELY DRIVING AN ANCHOR ROD INTO A BOREHOLE

(71) Applicant: Inventio AG, Hergiswil (CH)

(72) Inventors: Andrea Cambruzzi, Zurich (CH); Eliza Olczyk, Lucerne (CH); Oliver Simmonds, Lucerne (CH); Philipp Zimmerli, Harkingen (CH)

(73) Assignee: INVENTIO AG, Hergiswil (CH)

( * ) Notice: Subject to any disclaimer, the term of this patent is extended or adjusted under 35 U.S.C. 154(b) by 263 days.

(21) Appl. No.: 17/593,699

(22) PCT Filed: Apr. 1, 2020

(86) PCT No.: PCT/EP2020/059216
§ 371 (c)(1),
(2) Date: Sep. 23, 2021

(87) PCT Pub. No.: WO2020/212143
PCT Pub. Date: Oct. 22, 2020

(65) Prior Publication Data
US 2022/0168880 A1 Jun. 2, 2022

(30) Foreign Application Priority Data
Apr. 15, 2019 (EP) .................................... 19169211

(51) Int. Cl.
*B25D 17/00* (2006.01)

(52) U.S. Cl.
CPC ...... *B25D 17/005* (2013.01); *B25D 2250/141* (2013.01); *B25D 2250/371* (2013.01)

(58) Field of Classification Search
CPC ............ B25D 17/005; B25D 2250/141; B25D 2250/371
See application file for complete search history.

(56) References Cited

U.S. PATENT DOCUMENTS 3,042,004 A * 7/1962 Fischer .................... B25C 1/00 279/19
4,071,094 A * 1/1978 Kilin ...................... B25D 17/08 267/180

(Continued)

FOREIGN PATENT DOCUMENTS

CN 101292074 A 10/2008
CN 102635616 A 8/2012

(Continued)

*Primary Examiner* — Joshua G Kotis
*Assistant Examiner* — Scott A Howell
(74) *Attorney, Agent, or Firm* — William J. Clemens; Shumaker, Loop & Kendrick, LLP

(57) ABSTRACT

A setting tool used in a method for percussively driving an anchor rod into a borehole in a substrate has a drive-side end and, in an opposite tool direction, an end facing away from the drive. The setting tool has a tool adapter that forms the drive-side end and is arranged to interact with a driven impact tool. The end facing away from the drive is formed by a receiving element that has a recess arranged to receive part of an anchor rod. The tool adapter and the receiving element are coupled together by a coupling element such that an impact force introduced via the tool adapter is transmitted to an anchor rod arranged in the recess of the receiving element. The coupling element, in particular a coil spring, is arranged to allow for a displacement of at least part of the receiving element transversely to the tool direction.

15 Claims, 6 Drawing Sheets

(56) References Cited

U.S. PATENT DOCUMENTS

| | | | | | |
|---|---|---|---|---|---|
| 4,140,161 | A * | 2/1979 | Russo | B25B 23/10 81/451 |
| 5,050,286 | A * | 9/1991 | Miyanaga | F16B 13/0858 173/90 |
| 5,851,151 | A | 12/1998 | Reynolds | |
| 6,131,434 | A * | 10/2000 | Schneider, Jr. | B21D 39/02 29/243.5 |
| 8,302,513 | B2 * | 11/2012 | Evatt | B25B 23/0064 81/177.2 |
| 8,424,180 | B2 | 4/2013 | Wallek | |
| 8,602,285 | B2 * | 12/2013 | Santamarina | B25B 23/0035 81/463 |
| 9,975,232 | B2 * | 5/2018 | Neitzell | B25D 17/02 |
| 11,105,356 | B2 * | 8/2021 | Pauba | B25B 31/00 |
| 2006/0175773 | A1 * | 8/2006 | Tsai | B25F 3/00 279/143 |
| 2008/0289459 | A1 * | 11/2008 | Yablon | B25B 23/0064 81/451 |
| 2011/0089218 | A1 * | 4/2011 | Santamarina | B25B 23/0035 408/230 |
| 2018/0028305 | A1 * | 2/2018 | von Oepen | A61F 2/95 |
| 2019/0277322 | A1 * | 9/2019 | Pauba | F16B 13/063 |
| 2022/0009006 | A1 * | 1/2022 | Cambruzzi | G05B 19/402 |

FOREIGN PATENT DOCUMENTS

| | | | |
|---|---|---|---|
| CN | 104105840 | A | 10/2014 |
| CN | 104797383 | A | 7/2015 |
| CN | 106499351 | A | 3/2017 |
| CN | 208122836 | U | 11/2018 |
| CN | 109057843 | A | 12/2018 |
| DE | 4018175 | A1 | 12/1991 |
| DE | 9204403 | U1 | 6/1992 |
| DE | 10214676 | A1 | 2/2003 |
| EP | 3103591 | A1 | 12/2016 |
| EP | 3546127 | A1 | 10/2019 |
| GB | 1342786 | A | 1/1974 |
| WO | 2009115268 | A1 | 9/2009 |
| WO | 2014076125 | A1 | 5/2014 |
| WO | 2017016783 | A1 | 2/2017 |

* cited by examiner

SETTING TOOL AND METHOD FOR PERCUSSIVELY DRIVING AN ANCHOR ROD INTO A BOREHOLE

FIELD

The invention relates to a setting tool and a method for percussively driving an anchor rod into a borehole.

BACKGROUND

In EP 3546127 A1, a setting tool and a method for percussively driving an anchor rod into a borehole are described. The setting tool is particularly suitable for being used by a robot, so that the method using the setting tool is carried out in particular by a robot.

The setting tool according to EP 3546127 A1 has a drive-side end and, in an opposite tool direction, an end facing away from the drive. It has a tool adapter which forms the drive-side end and is designed and arranged such that it can interact with a driven impact tool. The end facing away from the drive is formed by a receiving element which has a recess designed and arranged such that it can receive part of an anchor rod extending in the tool direction away from the end facing away from the drive. The tool adapter and the receiving element are coupled to one another such that an impact force, which is oriented in the tool direction and directed in the direction of the end facing away from the drive and introduced via the tool adapter, is transmitted to an anchor rod arranged in the recess of the receiving element. After the anchor rod has been driven into the borehole, the setting tool must be removed from the anchor rod which is firmly anchored in the borehole. With the known setting tool, this can lead to problems, in particular to a jamming of the anchor rod in the recess of the receiving element.

EP 3103591 A1 and WO 2014/076125 A1 also describe setting tools for percussively driving an anchor rod into a borehole.

SUMMARY

In contrast, the problem addressed by the invention in particular is that of proposing a setting tool and a method for percussively driving an anchor rod into a borehole, which allow for a reliable driving-in of anchor rods, in particular by means of an automated mounting device.

The setting tool according to the invention for percussively driving an anchor rod into a borehole in a substrate has a drive-side end and, in an opposite tool direction, an end facing away from the drive. It has a tool adapter which in particular forms the drive-side end and is designed and arranged such that it can interact with a driven impact tool. The end facing away from the drive is formed in particular by a receiving element which has a recess designed and arranged such that it can receive, in a guided manner, part of an anchor rod extending in a guide direction away from the end facing away from the drive. The tool adapter and the receiving element are coupled to one another such that an impact force, which is oriented in the tool direction and directed in the direction of the end facing away from the drive and introduced via the tool adapter, is transmitted to an anchor rod arranged in the recess of the receiving element. According to the invention, the tool adapter and the receiving element are coupled by means of a coupling element which is designed and arranged such that it allows for a displacement relative to the tool adapter of at least part of the receiving element transversely to the tool direction. The displacement of the receiving element can take place, for example, by pivoting the receiving element relative to the tool adapter transversely to the tool direction and/or by moving the receiving element transversely to the tool direction. The displacement can also have a component in the tool direction. The coupling element thus represents a connection between the tool adapter and the receiving element, which is flexible in a direction transverse to the tool direction. For this purpose, the coupling element is designed such that it allows for the displacement transversely to the tool direction during the percussive driving of the anchor rod into a borehole in a substrate. The coupling element thus allows for the displacement transversely to the tool direction during the driving-in before the setting tool is removed from the driven-in anchor rod.

When an anchor rod is inserted into the receiving element, it is aligned in the guide direction through the guided accommodation in the receiving element. If no forces act transversely to the tool direction on the anchor rod or the receiving element, the guide direction is the same as the tool direction. As long as the anchor rod is aligned in the guide direction or deviates only slightly from the guide direction, the setting tool can be removed from the anchor rod without any problems.

When an anchor rod is driven into a borehole, it inevitably aligns itself with the course of the borehole; it assumes an anchor rod direction which is determined by the course of the borehole. When drilling a borehole in a substrate, in particular in concrete, it is possible that the actual course of the borehole deviates from a desired or intended target course. For example, there can be an angular offset of a few degrees, for example, up to 10°, and/or a transverse offset in the range of a few millimeters, for example, up to 5 mm, with respect to the target course. It is thus possible that an anchor rod partially received in the recess of a receiving element has an anchor rod direction which deviates from the guide direction. In order to ensure that the setting tool can in this case also be removed from the anchor rod without problems, the guide direction should be adapted to the anchor rod direction at least during removal.

The tool direction is determined by the alignment of the impact tool. In particular, when guiding the impact tool with an automated mounting device, the alignment of the impact tool is specified by the automated mounting device. The specification is based in particular on the target course of the borehole known to the mounting device. If the receiving element has no possibility of a displacement transversely to the tool direction and therefore no possibility of changing the orientation of the guide direction relative to the tool direction, the guide direction cannot adapt to the anchor rod direction predetermined by the course of the actual borehole. As a result, a deviation of the guide direction from the anchor rod direction can lead to a jamming of the anchor rod in the recess of the receiving element. Such a jamming leads in particular to the fact that the setting device can no longer be easily removed from the anchor rod after the anchor rod has been driven into a borehole. The driving of the anchor rod into a borehole can thus not be reliably completed. The problem described occurs in particular when using an automated mounting device.

The coupling element of the setting tool according to the invention allows for a displacement of at least part of the receiving element transversely to the tool direction and thus for a change in the orientation of the guide direction relative to the tool direction. Therefore, with a fixed tool direction, the guide direction can adapt to the anchor rod direction if, as described, it is determined by the course of a borehole.

The coupling element is designed such that it can compensate for the above-mentioned angular offset and transverse offset. The course of the guide direction corresponding to the anchor rod direction ensures, as described, a problem-free removal of the setting tool from driven-in anchor rods and thus a reliable driving of anchor rods into a borehole, in particular by means of an automated mounting device. In a particularly advantageous manner, a plurality of anchor rods can be reliably driven successively into boreholes without requiring manual intervention by an operator of the automated mounting device. This allows for a particularly cost-effective use of the setting tool. The aforementioned automated mounting device can be designed, for example, in accordance with a mounting device described in WO 2017/016783 A1.

The anchor rod has a mainly cylindrical basic form. In particular, it is made of metal and can in particular be part of an expansion anchor, preferably an expansion anchor of the bolt type. An expansion anchor is particularly characterized in that it has a movable expansion element, for example, an expansion sleeve, which is pushed radially outward by an expansion body arranged on the anchor rod when the expansion body is axially offset relative to the expansion element. In order to make the aforementioned offset of the expansion body toward the expansion element possible, the anchor rod has in particular an external thread onto which a nut can be screwed after the driving into the borehole and braced against the substrate, for example, in the form of a wall, having the borehole. As a result of the bracing, the anchor rod is pulled out of the borehole again to a small extent and the expansion body is thus axially offset relative to the expansion element. The nut and a possibly present washer can already be screwed onto the external thread while the anchor rod is being driven in, or they can be screwed on after it has been driven in.

In the simplest case, the tool adapter is designed to be cylindrical at the drive-side end. In particular, however, it has an outer contour adapted to the drill chuck of the impact tool. For this purpose, the drive-side end can be designed, for example, to be mainly cylindrical and have two opposite grooves running in the tool direction.

The impact tool can in particular be driven electrically, but a pneumatic or hydraulic drive is also conceivable. In particular, the impact tool only performs an impact movement but no simultaneous rotary movement. It is thus designed as an impact hammer that is operated in a so-called chisel mode.

The recess of the receiving element is designed in particular to be cylindrical. The diameter of the recess is then adapted to a diameter of the anchor rod such that the anchor rod is aligned by the recess in the guide direction and guided when it is driven into a borehole. The receiving element can be designed such that it can receive an anchor rod without a screwed-on nut or with a screwed-on nut. In particular, the recess is adapted to the part of the anchor rod to be received such that the part of the anchor rod is received by the recess transversely to the tool direction with little or no play.

The tool adapter, the coupling element, and the receiving element are made in particular from metal, for example, from so-called tool steel.

In one embodiment of the invention, the tool adapter, the receiving element, and the coupling element are designed and arranged such that the impact force or at least part thereof is transmitted directly from the tool adapter to the receiving element. In this case, the coupling element is designed such that it does not, or only to a negligible extent, participate in the transmission of the impact force. As a result, the coupling element does not have to be dimensioned and designed such that it can transmit forces to a significant extent in the tool direction. It can thus have a simple, light and cost-effective design.

The tool adapter, the receiving element, and the coupling element are in particular designed and arranged such that, at least during the transmission of the impact force, the receiving element has a contact surface with the tool adapter, via which the impact force can be transmitted. The receiving element then transmits the impact force to the anchor rod.

In one embodiment of the invention, the tool adapter, the receiving element, and the coupling element are designed and arranged such that the impact force or at least part thereof is transmitted directly from the tool adapter to an anchor rod arranged in the recess of the receiving element. In this case, the coupling element and the guide element are designed in particular such that they do not, or only to a negligible extent, participate in the transmission of the impact force. As a result, the coupling element and the receiving element do not have to be dimensioned and designed such that they can transmit forces to a significant extent in the tool direction. They can thus have a simple, light and cost-effective design.

The tool adapter, the receiving element, and the coupling element are designed and arranged in particular such that, at least during the transmission of the impact force, an anchor rod arranged in the recess of the receiving element has a contact surface with the tool adapter, via which the impact force can be transmitted. For this purpose, the receiving element is designed in particular as a sleeve that is open both in the direction of the end facing away from the drive and in the direction of the tool adapter.

In one embodiment of the invention, the coupling element is designed as a coil spring. In particular, it is arranged such that its axial direction runs in the tool direction. Coil springs are available inexpensively on the market in a wide variety of designs. The design of the coupling element as a coil spring thus allows for a particularly cost-effective setting tool. In addition, a coil spring has the necessary flexibility transversely to its axial direction.

The coil spring is made in particular of metal, for example, of so-called spring steel. This also makes it particularly resilient.

In one embodiment of the invention, the tool adapter and/or the receiving element have a thread onto which the coupling element designed as a coil spring is screwed. This allows for a particularly simple and cost-effective coupling of the tool adapter to the receiving element. It is particularly advantageous if both the tool adapter and the receiving element have a thread. In particular, the threads on the tool adapter and on the receiving element are designed to be identical. As a result, a coil spring with a constant diameter can be used. In this case, the orientation of the coil spring also does not have to be taken into account when mounting the setting tool. The threads are designed in particular as external threads.

In one embodiment of the invention, the coupling element is made from an elastomeric material, i.e., from an elastomer. Elastomer refers to a dimensionally stable but elastically deformable plastic. The deformability of the coupling element allows for the necessary displacement of at least part of the receiving element relative to the tool adapter transversely to the tool direction. Components made of elastomers with different properties can be produced easily and inexpensively, resulting in a particularly cost-effective setting tool. In addition, elastomers are very resilient, so that the setting tool can be used for a long time.

The tool adapter and the receiving element can be connected by means of the coupling element, for example, in a friction-locking or interlocking manner. It is also conceivable that the coupling element is connected, for example, glued, both to the tool adapter and to the receiving element.

In particular, the tool adapter and the receiving element overlap in the tool direction in an overlap region. For example, the receiving element is arranged radially further outward in the overlap region than the tool adapter, wherein a reverse arrangement is also possible. The coupling element is then arranged in the overlap region. The coupling element is clamped in particular between the tool adapter and the receiving element and thus establishes a frictional connection between the tool adapter and the receiving element. Alternatively or additionally, the coupling element can be glued to the tool adapter and/or the receiving element. Alternatively or additionally, an interlocking connection of the coupling element with the tool adapter and/or the receiving element is also possible.

In particular, the tool adapter has a mainly cylindrical basic form in the overlap region and the receiving element has a mainly hollow cylindrical basic form, wherein an inner diameter of the receiving element is somewhat, for example, between 4 and 20 mm, larger than an outer diameter of the tool adapter. The coupling element made of elastomer, which is also hollow-cylindrical, is then arranged between the tool adapter and the receiving element.

In one embodiment of the invention, the receiving element has a retaining element which is designed and arranged such that it can apply a retaining force oriented in the guide direction and directed in the direction of the drive-side end to an anchor rod arranged in the recess of the receiving element, which counteracts a removal of the anchor rod in the guide direction from the recess of the receiving element.

In this way, an anchor rod, including any associated components, can be picked up by the setting tool and inserted into the borehole. No second hand or further gripping device is necessary for inserting and subsequent setting or driving in the anchor rod. If a worker sets the anchor rod, it requires only one hand to guide the impact tool; the other hand can be used, for example, for securing purposes. This is particularly important if the worker is located on a work platform, for example, in an elevator shaft of an elevator system. The setting tool thus allows for a driving in of the anchor rod which is simple, quick and also safe for the worker. The setting tool according to this embodiment allows in a particularly advantageous manner that an anchor rod, including any associated components, can be picked up by an automated mounting device only with the setting tool, i.e., without a time-consuming tool change, and driven into a borehole. No additional tool is required to pick up the anchor rod and insert it into the borehole. The mounting device thus only requires one manipulator, for example, in the form of a robot, for guiding the setting tool and no second manipulator for guiding a gripping tool. The setting tool thus particularly advantageously allows for the anchor rod to be driven in quickly with an automated mounting device which only has to have one manipulator, i.e., it can be designed to be comparatively simple and cost-effective.

The retaining element can permanently apply the retaining force to an anchor rod arranged in the recess of the receiving element. However, it is also possible that the retaining element only applies the retaining force when a pull-out force oriented away from the end facing away from the drive acts in the guide direction. Without the counteracting retaining force, the pull-out force would result in the anchor rod being removed from the recess of the receiving element. The retaining force is then a reaction force to the pull-out force. It can be based, for example, on friction, in particular static friction between the retaining element and anchor rod, or on an interlocking connection between the retaining element and the anchor rod, for example, a thread of the anchor rod.

The retaining force can also have a component transverse to the guide direction. The retaining force is in particular greater than a weight force of the anchor rod and any components associated with the anchor rod, such as, for example, nut, washer and/or expansion sleeve. The retaining force can exceed the weight force in particular by a safety margin. In particular, it is thus selected such that an anchor rod including associated components standing in a magazine can be removed upwards from the magazine with the setting tool without the anchor rod falling out of the setting tool and without the need for a further tool, for example, in the form of a gripping tool. The retaining force is, for example, greater than 0.5 N-2.5 N.

In one embodiment of the invention, the receiving element has at least one magnet as a retaining element, which can apply the retaining force to a magnetizable anchor rod. In this way, a permanent or permanently acting retaining force can be applied to the anchor rod. In addition, the retaining force thus acts without any mechanical interaction between the receiving element and the anchor rod, so that there is no wear or tear on the receiving element.

A magnetizable anchor rod or, more generally, a magnetizable component refers herein to a component that is attracted by a magnet, i.e., that can be magnetized at least temporarily by a magnet. Anchor rods consist, for example, of steel with a so-called ferritic structure, for example, of galvanically nickel-plated steel, and are therefore magnetizable.

The magnet is designed in particular as a permanent magnet and specifically as a permanent magnet made of a neodymium-iron-boron alloy with the composition $Nd_2Fe_{14}B$. The receiving element can have one or more magnets which are arranged one behind the other in the guide direction.

The magnet is arranged in particular around the recess of the receiving element. This allows for a simple structure of the receiving element. The magnet can be designed, for example, to be annular. Since annular magnets are available on the market in great numbers, a suitable and cost-effective magnet can easily be found.

The magnet or magnets can be arranged to be partially or completely offset relative to the recess in the guide direction.

The magnet is arranged in particular in the guide direction between the recess of the receiving element and the drive-side end. The magnetic pull between the magnet or magnets and the anchor rod thus acts directly in the guide direction and therefore generates a very strong retaining force on the anchor rod.

It is also possible that the receiving element has both a magnet arranged around the recess of the receiving element and a magnet arranged in the guide direction between the recess of the receiving element and the drive-side end. As a result, a particularly strong retaining force can be generated.

It is also possible that at least part of the receiving element and/or the tool adapter is magnetic, i.e., is designed as a magnet. The receiving element is not magnetic, in particular in the region of the recess, so as not to impede the insertion of an anchor rod.

In particular, a bottom of the recess of the receiving element is formed by a strike plate and the magnet adjoins the strike plate in the direction of the drive-side end. The magnet can thus be protected from damage by the strike plate when the anchor bolt is driven in, which allows for a long service life of the setting tool.

The bottom of the recess of the receiving element herein refers to a closure of the recess in the direction of the drive-side end. The strike plate consists in particular of a durable material, in particular of hardened steel, in particular of tool steel. It is therefore not damaged when an anchor bolt is driven in and can, in particular, effectively protect the magnet from damage. The strike plate can be secured in the guide direction, for example, by a locking ring, in particular a metal ring, arranged in a continuous groove of the recess. It is also possible for the strike plate to be clamped between two components of the receiving element and thus also be secured in the guide direction.

In one embodiment of the invention, the receiving element has a press-on element which is designed and arranged such that it pushes the magnet in the direction of the strike plate. In this way, the magnet can advantageously dodge in the event of excessive impacts and thus be protected from damage. However, the press-on element pushes it back into its target position, i.e., adjacent to the strike plate.

The press-on element is arranged, for example, as a spring, in particular a coil spring arranged in the guide direction and at least slightly pretensioned, which is arranged between the magnet and the drive-side end. It is also possible that the press-on element consists of an elastic material, for example, foam, and is also arranged between the magnet and the drive-side end.

With the exception of the strike plate, the magnet, and the press-on element, the receiving element consists in particular exclusively of non-magnetizable material. As a result, the further non-magnetizable components of the receiving element cannot interfere with the magnetic field of the magnet or magnets, so that the magnet exerts a particularly strong retaining force on the anchor rod. It is also possible that the press-on element also consists of a non-magnetizable material.

The further non-magnetizable components of the receiving element consist in particular of chromium-nickel steel with an austenitic structure.

In one embodiment of the invention, the retaining element is designed as at least one clamping element which is elastic at least transversely to the guide direction and which reduces a cross section of the recess of the receiving element transversely to the guide direction. The retaining force can thus be applied particularly easily.

In this case, the combination of recess and clamping element is adjusted to the anchor rod to be driven in such that the clamping element reduces the cross section of the recess to such an extent that it comes into contact with an anchor rod arranged in the recess of the receiving element. In this case, the clamping element only applies the retaining force when a pull-out force oriented away from the end facing away from the drive acts in the guide direction. The retaining force is then a reaction force to the pull-out force. It can be based, for example, on friction, in particular static friction between the retaining element and the anchor rod, or on an interlocking connection between the retaining element and the anchor rod, for example, a thread of the anchor rod.

The clamping element can be designed in different ways. It can be designed, for example, as a ring, in particular an O-ring or a metal ring, arranged in a continuous groove of the recess of the receiving element. In the case of the design as a metal ring, the clamping element can have an inner contour through which the force for inserting an anchor bolt into the recess of the receiving element is smaller than a force for pulling the anchor bolt out of the recess. This can be realized, for example, in that an inner diameter of the metal ring decreases slightly both from the drive-side end and from the end facing away from the drive, and the decrease of the inner diameter is steeper at the drive-side end than at the end facing away from the drive.

The clamping element is designed in particular as a mainly U-shaped bracket, the arms of which are inserted into two punctures of the receiving element, which are opposite one another and aligned transversely to the guide direction. The punctures are inwardly open, so that the bracket bears against a part of an anchor rod accommodated in the recess of the receiving element. This allows for a particularly simple and cost-effective retaining element. The bracket consists in particular of metal.

In one embodiment of the invention, the retaining element is formed by at least two, in particular three, arms which are elastic transversely to the guide direction and designed and arranged such that an anchor rod arranged in the recess of the receiving element pushes the arms outwards against a tensioning force. This allows for a particularly simple design of the setting tool.

The arms thus form the end of the setting tool facing away from the drive. They are made in particular from spring steel and fastened to the receiving element, in particular screwed or riveted to the receiving element. The retaining force is therefore also a reaction force to the above-mentioned pull-out force on the anchor bolt.

In one embodiment of the invention, the retaining element is formed by an elastic pressing element with an in particular continuous recess in the guide direction. An inner diameter of the pressing element is selected such that the pressing element exerts a pressing force transversely to the guide direction on a part of an anchor rod arranged in the recess of the receiving element. This allows for a particularly simple design of the setting tool.

The pressing element can consist, for example, of acrylonitrile butadiene rubber, or nitrile rubber for short. It can have a continuous, inwardly aligned collar, which dips into a continuous groove of the receiving element and is thus fixed with respect to the receiving element. It is also possible for the pressing element to form the only recess in the receiving element.

A slotted sleeve, in particular a slotted steel sleeve, can be arranged in the recess of the pressing element to avoid abrasion on the pressing element by the anchor rod.

The above-mentioned problem is also solved by a method for percussively driving an anchor rod into a borehole with a driven impact tool and a setting tool with the features mentioned. The method is carried out in particular during the installation of an elevator system in an elevator shaft. However, it can also be used for completely different installation work in which anchor bolts have to be driven into a borehole. In this case, the anchor rod is in particular part of an expansion anchor.

The method according to the invention has the advantages described above in connection with the setting tool according to the invention.

The method can in particular have the following steps:

picking up an anchor rod from a magazine with the setting tool, positioning the anchor rod in alignment with the borehole, setting the anchor rod into the borehole by transmitting an impact force of the impact tool to the anchor rod via the setting tool, and removing the setting tool from the anchor rod driven into the borehole.

The method is also particularly characterized in that the setting tool is guided by a robot when the method is carried out. The robot can in particular be part of a mounting device described in WO 2017/016783 A1.

The setting of an anchor rod or an expansion anchor having an anchor rod in a borehole can thus be carried out particularly quickly, since the robot only needs a single tool for picking up, positioning and setting the anchor rod or the expansion anchor, so that no tool change is necessary between individual method steps.

It must be noted that some of the possible features and advantages of the invention are described herein with reference to different embodiments of the setting tool according to the invention and the method according to the invention. A person skilled in the art recognizes that the features can be combined, adapted, transferred or exchanged in a suitable manner in order to arrive at further embodiments of the invention.

Further advantages, features and details of the invention will become apparent from the following description of embodiments and from the drawings, in which identical or functionally identical elements are denoted with identical reference signs. The drawings are merely schematic and not to scale.

DETAILED DESCRIPTION

Figure 1:
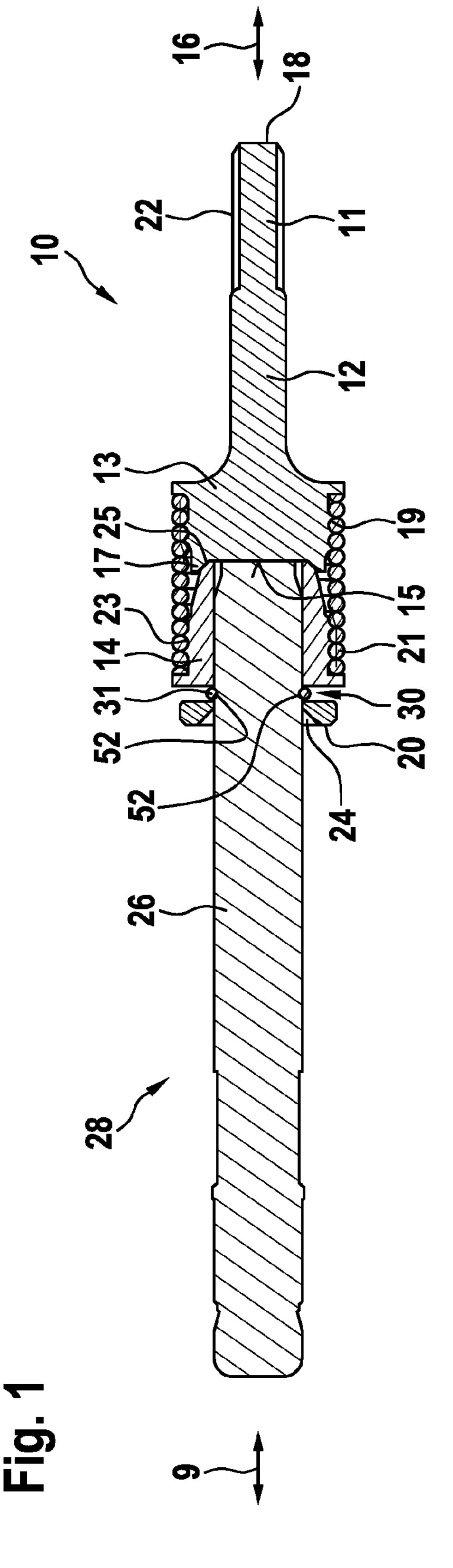
FIG. 1 shows a first embodiment of a setting tool with a coil spring as a coupling element and with a bracket as a retaining element with equally oriented tool direction and guide direction.

According to FIG. 1, a setting tool 10 has a tool adapter 12 and a receiving element 14, which are designed as separate components. The tool adapter 12 is aligned in a tool direction 16 and has a drive-side end 18 which also forms the drive-side end of the setting tool 10. The tool adapter 12 has two portions. A first portion 11 has a mainly cylindrical shape with two diametrically opposed grooves 22 running in the tool direction 16. The tool adapter 12 is provided to be received by a chuck 74 of a driven impact tool 76 which is only shown in FIG. 11. The shape of the tool adapter 12 is adapted to the chuck 74 of the impact tool 76. The tool adapter 12 is thus designed and arranged such that it can interact with the driven impact tool 76. The first portion 11 of the tool adapter 12 merges into a second portion 13 which is also mainly cylindrical but is designed to have a larger diameter than the first portion 11. A strike surface 15 closes off the second portion 13 and thus the tool adapter 12 on a side opposite the drive-side end 18. On the outer side, the strike surface 15 has a continuous collar 17. A first external thread 19, onto which a coupling element in the form of a coil spring 21 is screwed, is arranged on the second portion 13.

The coil spring 21 couples the tool adapter 12 to the receiving element 14 which forms an opposite end 20 of the setting tool 10, which is opposite the drive-side end 18 in the tool direction 16 and faces away from the drive. The receiving element 14 is designed as a mainly hollow cylindrical sleeve which is aligned in a guide direction 9. The receiving element 14 is thus designed as a sleeve that is open in two directions. The receiving element 14 has a second external thread 23 corresponding to the first external thread 19, onto which the coil spring 21 is also screwed. An outer contour of the receiving element 14 tapers in the direction of the tool adapter 12 and at its closure in the direction of the tool adapter 12 has a bevel 25 corresponding to the collar 17 of the strike surface 15 of the tool adapter 12.

The tool adapter 12 and the receiving element 14 are made, for example, from tool steel. The setting tool 10 has, for example, a length between 100 and 180 mm.

The receiving element 14 has a recess 24 which is open in the direction of the end 20 facing away from the drive, into which an anchor rod 26 of an expansion anchor 28 aligned in the guide direction 9 is inserted. The recess 24 extends in the guide direction 9 through the entire receiving element 14, so that the anchor rod 26 bears against the strike surface 15 and thus has a contact surface with the tool adapter 12.

The recess 24 has, for example, a length in the guide direction 9 between 15 mm and 30 mm and an inner diameter between 8 mm and 24 mm. The recess 24 of the receiving element 14 thus receives, in a guided manner, part of the anchor rod 26 extending in the guide direction 9 away from the end 20 facing away from the drive. The anchor rod 26 is made, for example, of galvanically nickel-plated steel.

The receiving element 14 has a retaining element in the form of a mainly U-shaped bracket 30; only its two arms 31 can be seen in FIG. 1. For receiving the bracket 30, the receiving element 14 has two opposite punctures 52 on its outer side, which run transversely to the guide direction 9. The punctures 52 are so deep that they extend into the recess 24 of the receiving element 14. The bracket 30 is arranged on the receiving element 14 such that its two arms 31 run in the punctures 52 and thus reduce the cross section of the recess 24 transversely to the guide direction 9. In this case, the dimensions of the recess 24, the bracket 30, and the anchor rod 26 are selected such that an anchor rod 26 inserted into the recess 24 pushes the bracket 30 outwards at least temporarily during the insertion. The dimensions can be selected such that an anchor rod 26 inserted into the recess 24 permanently pushes the bracket 30 outwards and the bracket 30 thus exerts a clamping force on the anchor rod 26. It is also possible that the bracket 30 is not permanently pushed outwards by an inserted anchor rod 26; instead, the bracket hooks at least slightly onto the anchor rod 26 when the anchor rod 26 is pulled out, thus exerting a retaining force oriented in the guide direction and directed in the direction of the drive-side end 18 on the anchor rod 26 arranged in the recess 24 of the receiving element 14, which counteracts the removal of the anchor rod 26 in the guide direction 9 from the recess 24 of the receiving element 14.

In this case, the individual parts are dimensioned and matched such that the retaining force on the anchor rod 26 is greater by at least a safety margin of, for example, 20% than the weight force of the expansion anchor 28.

The anchor rod 26, and thus the expansion anchor 28, inserted into the recess 24 of the receiving element 14 are thus secured against unintentional removal from the recess 24. The setting tool 10 and thus the inserted expansion anchor 28 could also be aligned vertically downwards without the anchor rod 26 and thus the expansion anchor 28 falling out of the recess 24. As a result, the setting tool 10 can remove an expansion anchor 28 from a magazine 70 (see FIG. 11) in which it is stored in an upright manner.

Figure 11:
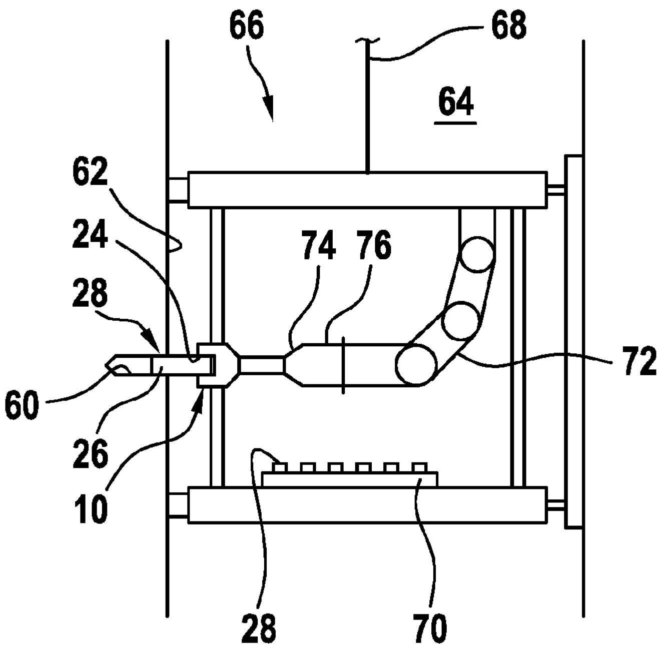
FIG. 11 shows a mounting device in an elevator shaft when setting an expansion anchor in a borehole.

When the tool adapter 12 is inserted into the chuck of a driven impact tool and an anchor rod 26 is inserted into the recess 24 of the receiving element 14, an impact force oriented in the tool direction 16 and directed in the direction of the end 20 facing away from the drive and introduced via the tool adapter 12 can be transmitted to the anchor rod 26 arranged in the recess 24 of the receiving element 14 and percussively drive it into a bore 60, shown only in FIG. 11, in a substrate, for example, a shaft wall 62 of an elevator shaft 64 of an elevator system. In this case, the impact force is transmitted directly from the tool adapter 12 via the strike surface 15 to the anchor rod 26.

In FIG. 1, no force acts transversely to the guide direction 9 on the anchor rod 26 and thus on the receiving element 14. The coil spring 21 thus aligns the receiving element 14 with respect to the tool adapter 12 such that the guide direction 9 and the tool direction 16 are the same. An anchor rod 26 can thus be inserted into the recess 24 of the receiving element 14 and also removed again without any problems, i.e., the setting tool 10 can be removed from an anchor rod 26 driven into a borehole.

Figure 2:
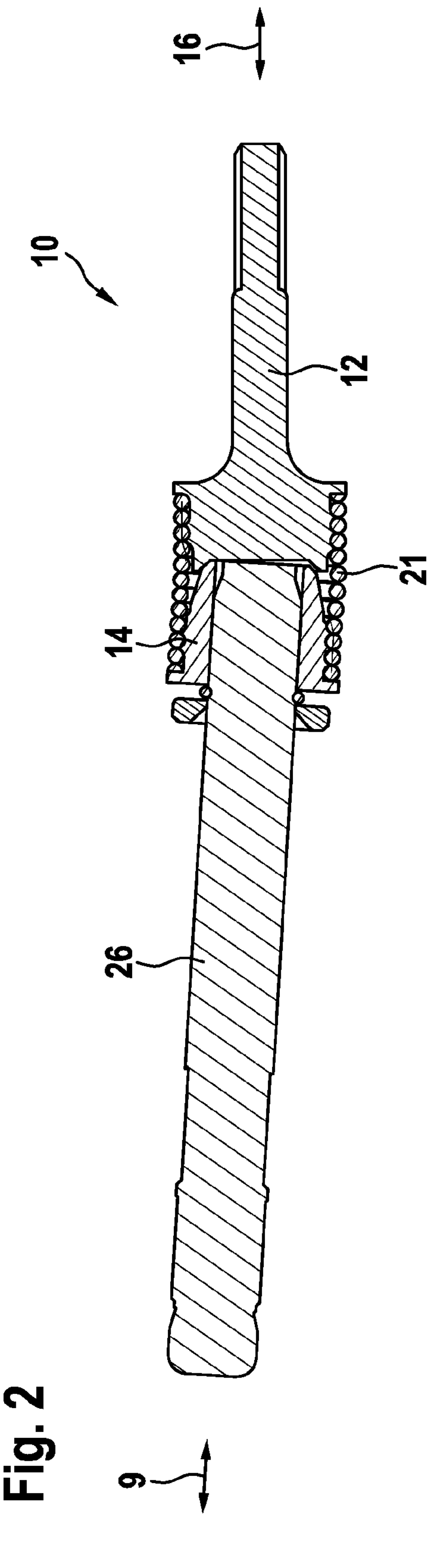
FIG. 2 shows the setting tool from FIG. 1 with an angular offset between the tool direction and the guide direction.

FIG. 2 shows the setting tool 10 in a state in which, due to the course of a borehole into which the anchor rod 26 is driven, the guide direction 9 has an angular offset relative to the tool direction 16, i.e., the two directions run at an angle other than zero to one another. In this case, the coil spring 21 is deflected transversely to the tool direction 16, so that the receiving element 14 is pivoted relative to the tool adapter 12. Therefore, when compared to the depiction in FIG. 1, at least parts of the receiving element 14 have been displaced transversely to the tool direction 16.

In the state shown in FIG. 2, the anchor rod 26 is also correctly aligned with respect to the receiving element 14, so that the setting tool 10 can be removed from the anchor rod 26 without any problems.

FIG. 2 shows an angular offset between the guide direction 9 and the tool direction 16 and its compensation is described by means of the coil spring 21. An additional or exclusive transverse offset between the guide direction 9 and the tool direction 16 can also be compensated for in an analogous manner.

Figure 3:
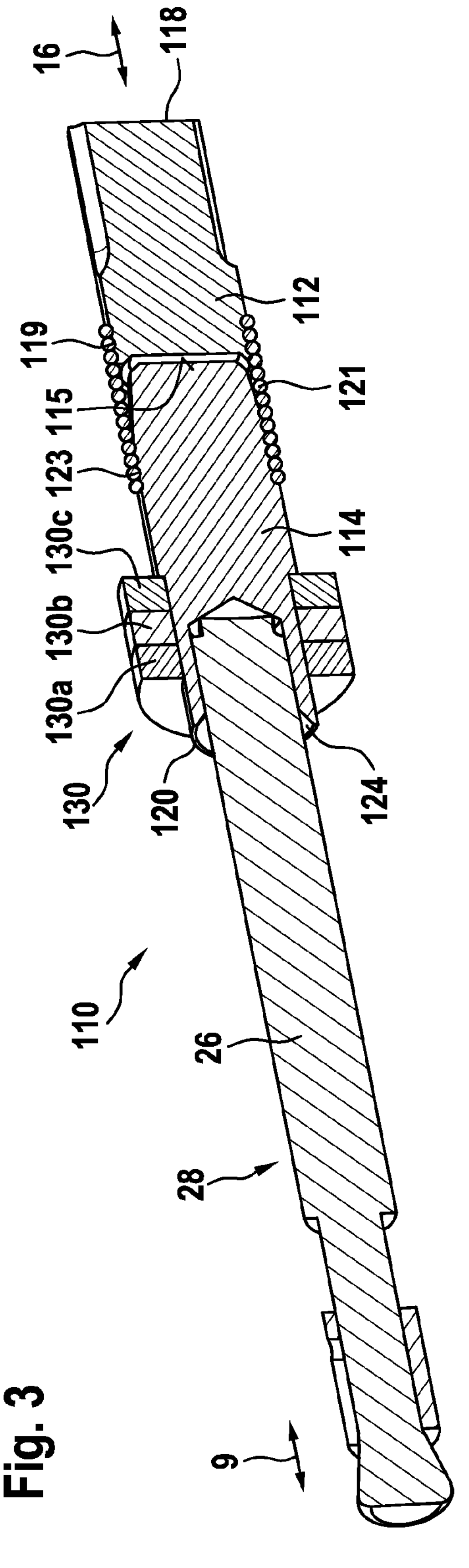
FIG. 3 shows a second embodiment of a setting tool with annular magnets as a retaining element.

A setting tool 110 according to FIG. 3 is structured similarly to the setting tool 10 according to FIGS. 1 and 2, which is why mainly the differences between the two setting tools will be described. The setting tool 110 also has a tool adapter 112 and a receiving element 114, which are made from a magnetizable material, for example, tool steel. The tool adapter 112 is designed to be mainly cylindrical and is closed on a side opposite a drive-side end 118 by a strike surface 115. The tool adapter 112 has a first external thread 119 onto which a coupling element in the form of a coil spring 121 is screwed.

The coil spring 121 couples the tool adapter 112 to the receiving element 114 which forms an end 120 of the setting tool 110 that is opposite to the tool direction 16 and faces away from the drive. The receiving element 114 also has a mainly cylindrical basic form. It has a second external thread 123 corresponding to the first external thread 119, onto which the coil spring 121 is also screwed. An outer contour of the receiving element 114 tapers in the direction of the tool adapter 112.

Analogously to the coil spring 21 from FIGS. 1 and 2, the coil spring 121 thus allows for a flexible coupling between the receiving element 114 and the tool adapter 112.

The receiving element 114 adjoins the tool adapter 112 in the direction of the end 120 facing away from the drive and forms the end 120 facing away from the drive. The receiving element 114 has a recess 124 which is open in the direction of the end 120 facing away from the drive and into which an anchor rod 26 of an expansion anchor 28 aligned in the guide direction 9 is inserted. The recess 124 has, for example, a length in the guide direction 9 between 15 mm and 30 mm and an inner diameter between 8 mm and 24 mm. The recess 124 of the receiving element 114 thus receives, in a guided manner, part of the anchor rod 26 extending in the guide direction 9 away from the end 120 facing away from the drive. The anchor rod 26 is made of a magnetizable material, for example, galvanically nickel-plated steel.

The receiving element 114 has a retaining element 130 in the form of three annular magnets **130*a*, 130*b*, 130*c* which are arranged one behind the other in the guide direction 9 around the recess 124 of the receiving element 114. The receiving element 114 has, at least in the region of the recess 124, a cylindrical outer contour onto which the annular magnets 130*a*, 130*b*, 130*c* are pressed. In this case, the magnets 130*a*, 130*b*, 130*c* are arranged offset in the guide direction 9 with respect to the recess 124 in the direction of the drive-side end 118**.

The magnets **130*a*, 130*b*, 130*c* attract the anchor rod 26 and thus hold it in the depicted position, i.e., inserted into the recess 124 of the receiving element 114. The retaining element 130 in the form of the magnets 130*a*, 130*b*, 130*c* thus applies a retaining force oriented in the guide direction 9 and directed in the direction of the drive-side end 118 to the anchor rod 26 arranged in the recess 124 of the receiving element 114, which counteracts a removal of the anchor rod 26 in the guide direction 9 from the recess 124 of the receiving element 114. In this case, the magnets 130*a*, 130*b*, 130*c* are dimensioned such that the retaining force on the anchor rod 26 is greater by at least a safety margin of, for example, 20% than the weight force of the expansion anchor 28**.

The anchor rod 26 inserted into the recess 124 of the receiving element 114 and thus the expansion anchor 28 are thus secured against unintentional removal from the recess 124. The setting tool 110 and thus the inserted expansion anchor 28 could also be aligned vertically downwards without the anchor rod 26 and thus the expansion anchor 28 falling out of the recess 124. As a result, the setting tool 110 can remove an expansion anchor 28 from a magazine 70 (see FIG. 11) in which it is stored in an upright manner.

When the tool adapter 112 is inserted into the chuck of a driven impact tool and an anchor rod 26 is inserted into the recess 124 of the receiving element 114, an impact force oriented in the tool direction 16 and directed in the direction of the end 120 facing away from the drive and introduced via the tool adapter 112 can be transmitted via the strike surface 115 to the receiving element 114 and from the receiving element 114 to the anchor rod 26 arranged in the recess 124 and thus percussively drive it into a bore 60, shown only in FIG. 11, in a substrate, for example, a shaft wall 62 of an elevator shaft 64 of an elevator system. In this case, the impact force is transmitted directly from the tool adapter 112 via the strike surface 115 to the receiving element 114.

In the description of the further embodiments of setting tools in connection with FIGS. 4 to 9, mainly the design of the retaining elements will be addressed. In the case of the setting tools according to FIGS. 4 to 8, the coupling between the tool adapter and the receiving element is designed in accordance with FIG. 3 and in the case of the setting tool according to FIG. 9, it is designed in accordance with FIGS. 1 and 2. Similar or identically acting parts are denoted with a reference sign which is higher by a multiple of one hundred than the corresponding reference sign in FIG. 1. The size specifications for individual components of the setting tool 10 in FIG. 1 also apply to all further setting tools described.

Figure 4:
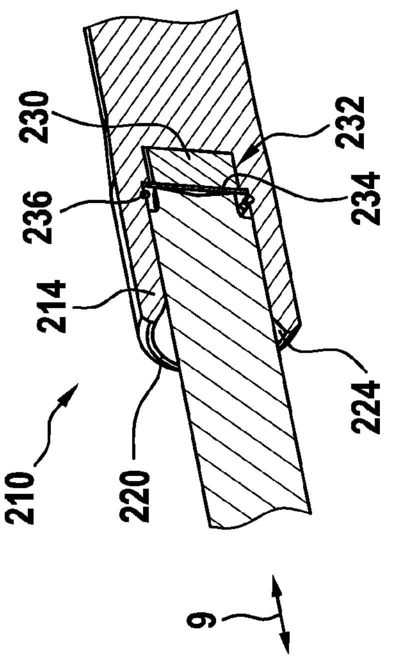
FIG. 4 shows part of a third embodiment of a setting tool with a cylindrical magnet as a retaining element.

According to FIG. 4, in a setting tool 210 according to a third embodiment, a retaining element is designed as a cylindrical magnet 230. The magnet 230 is arranged in the guide direction 9 between the recess 224 of the receiving element 214 and the drive-side end. For this purpose, a further recess 232 with a somewhat smaller inner diameter, in which the magnet 230 is arranged, adjoins the recess 224 in the direction of the drive-side end. A strike plate 234 adjoins the magnet 230 in the direction of the end 220 facing away from the drive, which is pushed, and thus secured, with a metallic safety ring 236 against a shoulder resulting from the transition from the recess 224 to the further recess 232. The strike plate 234 thus forms a bottom of the recess 224 of the receiving element 214. It consists of hardened steel and protects the magnet 230 from damage.

Figure 5:
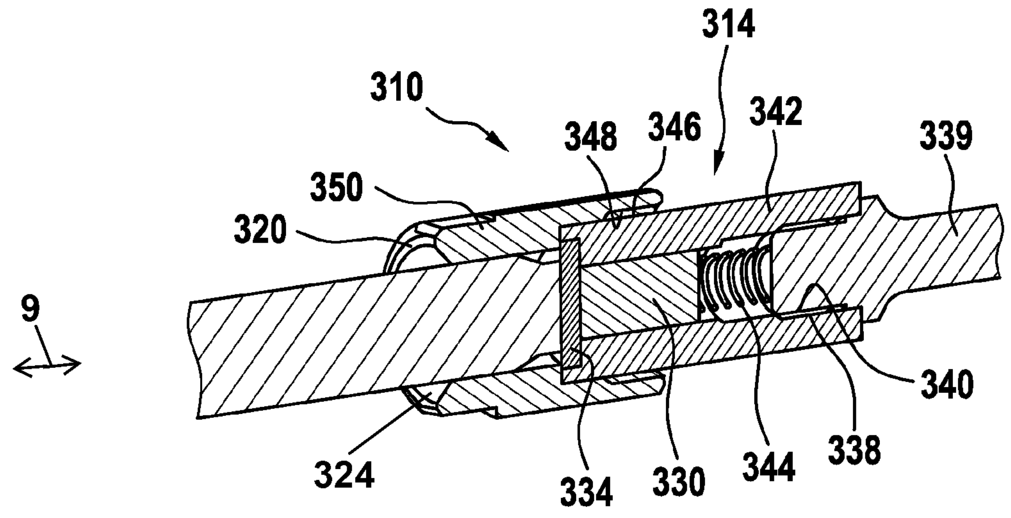
FIG. 5 shows part of a fourth embodiment of a setting tool with a cylindrical magnet as a retaining element.

According to FIG. 5, in a setting tool 310 according to a fourth embodiment, the receiving element 314 has a multi-piece design. A carrier part 339 coupled to the tool adapter (not depicted in FIG. 5) has an external thread 338 at its end 320 facing away from the drive, which is screwed into an internal thread 340 of an intermediate piece 342 of the receiving element 314. The intermediate piece 342 has a mainly hollow cylindrical basic form and is also aligned in the guide direction 9. A strike plate 334 is arranged on the opening of the intermediate piece 342 oriented in the direction of the end 320 facing away from the drive. In the region of the opening of the intermediate piece 342, the intermediate piece 342 has a somewhat larger inner diameter, resulting in a shoulder against which the strike plate 334 can be pushed. A retaining element in the form of a cylindrical magnet 330, which is pushed against the strike plate 334 by means of a press-on element in the form of a slightly pretensioned coil spring 344, adjoins in the interior of the intermediate piece 342 in the direction of the drive-side end. The coil spring 344 is supported both on the magnet 330 and on the carrier part 339.

At its end oriented in the direction of the end 320 facing away from the drive, the intermediate piece 342 has an external thread 346 which is screwed into an internal thread 348 of an end piece 350 adjoining the intermediate piece 342 in the direction of the end 320 facing away from the drive. The end piece 350, together with the strike plate 334, forms the recess 324 of the receiving element 314 and forms the end 320 facing away from the drive. It has a shoulder which is continuous on the inside and pushes the strike plate 334 against the shoulder of the intermediate piece 342, so that the strike plate 334 is clamped, and thus secured, between the intermediate piece 342 and the end piece 350.

The intermediate piece 342 and the end piece 350 are made of non-magnetizable material. However, the strike plate 334 consists of magnetizable material. The press-on element in the form of the coil spring 344 can consist of magnetizable or non-magnetizable material.

The screw connections between tool adapter (not shown), intermediate piece 342, and end piece 350 are all secured, in particular glued.

Figure 6:
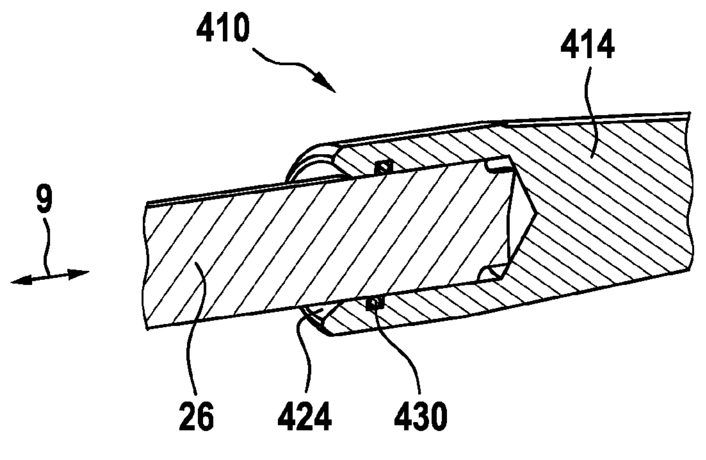
FIG. 6 shows part of a fifth embodiment of a setting tool with an O-ring as a retaining element.

FIG. 6 shows a receiving element 414 of a setting tool 410 according to a fifth embodiment and part of an anchor rod 26. The setting tool 410 is constructed very similarly to the setting tool 110 according to FIG. 3. The only difference is that the retaining element of the receiving element 414 is designed as an O-ring 430. The O-ring 430 is arranged in a continuous groove in the inner surface of the recess 424 of the receiving element 414. The O-ring 430 can be viewed as a clamping element that is elastic at least transversely to the guide direction 9 and reduces a cross section of the recess 424 of the receiving element 414 transversely to the guide direction 9. In this case, the dimensions of the recess 424, the O-ring 430, and the anchor rod 26 are selected such that an anchor rod 26 inserted into the recess 424 compresses the O-ring 430, so that it exerts a clamping force on the anchor rod 26.

Figure 7:
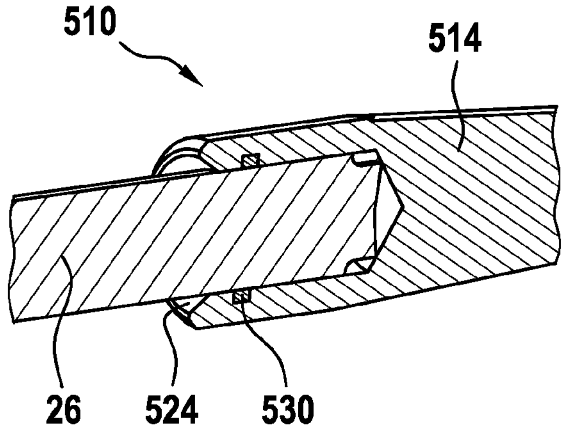
FIG. 7 shows part of a sixth embodiment of a setting tool with a metal ring as a retaining element.

FIG. 7 shows a receiving element 514 of a setting tool 510 according to a sixth embodiment and part of an anchor rod 26. The setting tool 510 is constructed very similarly to the setting tool 410 according to FIG. 6. The only difference is that the retaining element of the receiving element 514 is not designed as an O-ring but as a metal ring 530. The metal ring 530 has an inner contour, as a result of which the force for inserting the anchor rod 26 into the recess 524 of the receiving element 514 is smaller than a force for pulling the anchor rod 26 out of the recess 524. This is realized in that an inner diameter of the metal ring 530 decreases slightly both from the drive-side end and from the end facing away from the drive, and the decrease of the inner diameter at the drive-side end is steeper than at the end facing away from the drive.

Figure 8:
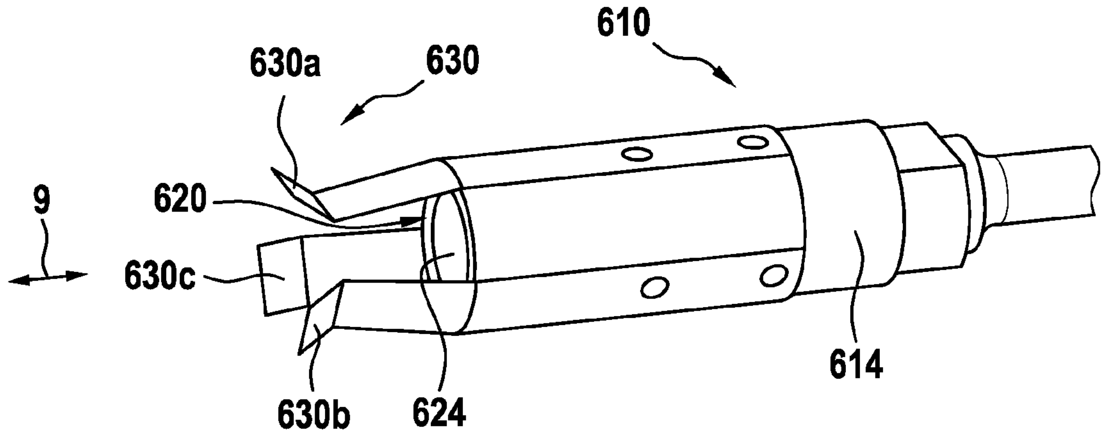
FIG. 8 shows part of a seventh embodiment of a setting tool with three arms as a retaining element.

FIG. 8 shows a setting tool 610 according to a seventh embodiment. The retaining element 630 is formed by three arms 630*a*, 630*b*, 630*c* that are elastic transversely to the guide direction 9. The arms 630*a*, 630*b*, 630*c* are fastened to the outer surface of the receiving element 614 with two rivets each and form the end 620 of the setting tool 610 facing away from the drive. The arms 630*a*, 630*b*, 630*c* are arranged such that an anchor rod (not depicted) arranged in the recess 624 of the receiving element 614 pushes the arms 630*a*, 630*b*, 630*c* outwards against a tensioning force.

Figure 9:
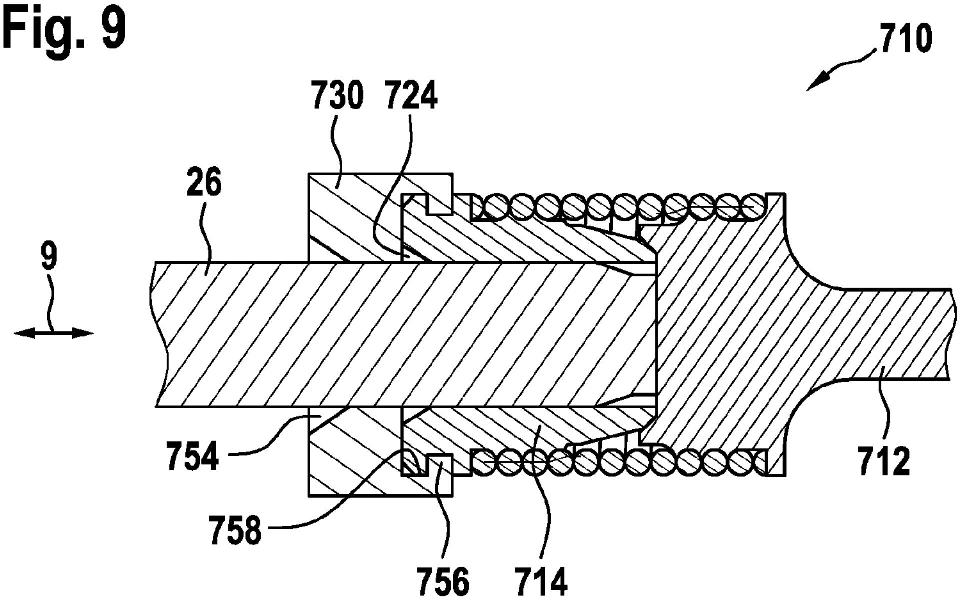
FIG. 9 shows part of an eighth embodiment of a setting tool with an elastic pressing element as a retaining element.

FIG. 9 shows a receiving element 714 and part of a tool adapter 712 of a setting tool 710 according to an eighth embodiment and part of an anchor rod 26. The setting tool 710 is constructed very similarly to the setting tool 10 according to FIG. 1. The only difference is that the retaining element of the receiving element 714 is formed as an elastic pressing element 730 with a continuous recess 754 in the guide direction 9. An inner diameter of the recess 754 of the pressing element 730 is selected such that the pressing element 730 exerts a pressing force transversely to the guide direction 9 on the anchor rod 26 arranged in the recess 724 of the receiving element 714. The pressing element 730 has a continuous, inwardly aligned collar 756 which dips into a continuous groove 758 of the receiving element 714. The pressing element 730 is thus fixed on the receiving element 714.

Figure 10:
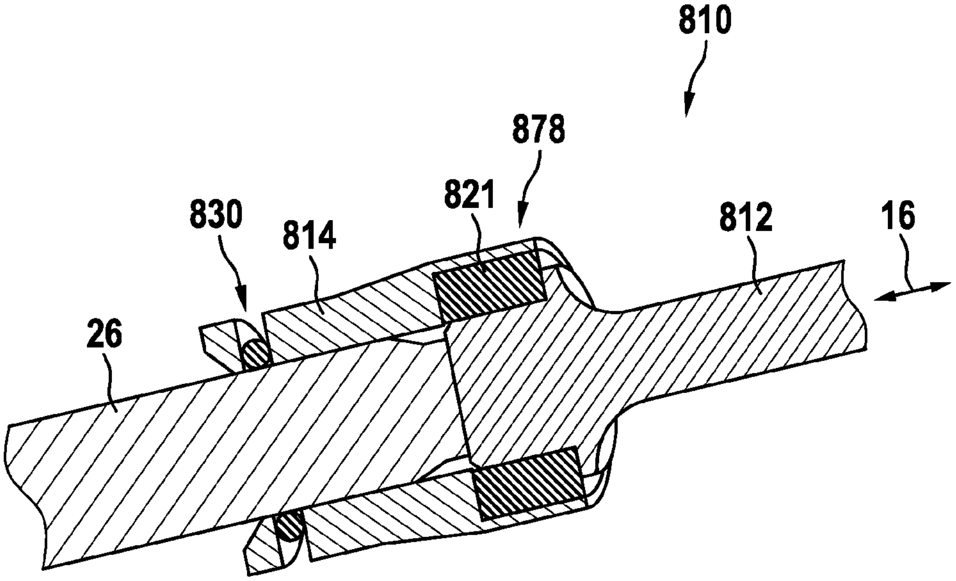
FIG. 10 shows part of a ninth embodiment of a setting tool with a coupling element made of an elastomeric material and an O-ring as a retaining element.

FIG. 10 shows a receiving element 814 and part of a tool adapter 812 of a setting tool 810 according to a ninth embodiment and part of an anchor rod 26. The tool adapter 812 and the receiving element 814 overlap in the tool direction 16 in an overlap region 878. The tool adapter 812 has a mainly cylindrical basic form in the overlap region 878 and the receiving element 814 has a mainly hollow cylindrical basic form. An inner diameter of the receiving element 814 is somewhat, for example, between 4 and 20 mm, larger than an outer diameter of the tool adapter 812. A hollow cylindrical coupling element 821 made of elastomer is clamped and thus arranged between the tool adapter 812 and the receiving element 814 in the overlap region 878. The coupling element 821 thus establishes a frictional connection between the tool adapter 812 and the receiving element 814. The receiving element 814 also has a retaining element 830 corresponding to the retaining element 30 in FIG. 1.

A method for setting, i.e., for percussively driving an expansion anchor 28 with an anchor rod 26 into a borehole 60 in a substrate designed as a shaft wall 62 of an elevator shaft 64 will be described in connection with FIG. 11. One of the setting tools described herein and shown in FIGS. 1 to 10 is used to drive in the expansion anchor 28. The setting tool 10 is shown as an example.

The method is carried out at least partially automatically by a mounting device 66 which can be displaced in the elevator shaft 64 by means of a suspension element 68. The mounting device 66 has a magazine 70 in which a plurality of expansion anchors 28 is stored in an upright manner. The mounting device 66 can drill the borehole 60 into the shaft wall 62 in particular with a drilling tool (not depicted). A robot 72 of the mounting device 66 then picks up an expansion anchor 28 from the magazine 70 with a setting tool 10 inserted into a chuck 74 of a driven impact tool 76. For this purpose, the setting tool 10 is moved from above onto the expansion anchor 28 such that the anchor rod 26 of the expansion anchor 28 dips into the recess 24 of the setting tool 10 and the anchor rod 26 is held by the retaining element (not depicted in FIG. 11) of the setting tool 10.

After an expansion anchor 28 has been picked up with the setting tool 10, the expansion anchor 28 and thus the anchor rod 26 are positioned in alignment with the borehole 60 by means of the robot 72. When the expansion anchor 28 and thus the anchor rod 26 are correctly aligned, the impact tool 76 is activated and the expansion anchor 28 is percussively driven into the borehole 60. For this purpose, an impact force applied by the impact tool 76 is transmitted via the setting tool 10 to the anchor rod 26 of the expansion anchor 28. After the expansion anchor 28 has been driven in, the setting tool 10 is removed from the anchor rod 26. The next expansion anchor can then be driven into a borehole.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A setting tool for percussively driving an expansion anchor into a borehole in a substrate, the setting tool having a drive-side end and, in a tool direction, an opposite end facing away from the drive-side end for receiving the expansion anchor, the setting tool comprising:

a tool adapter adapted to interact with a driven impact tool at the drive-side end;

a receiving element having a recess arranged at the opposite end to receive part of an anchor rod of the expansion anchor extending in a guide direction away from the setting tool;

wherein the tool adapter and the receiving element are coupled to one another such that an impact force introduced at the drive-side end oriented in the tool direction toward the opposite end is transmitted to the anchor rod when received in the recess of the receiving element and oriented in the guide direction; and wherein the tool adapter and the receiving element are configured with an axial overlap region in the tool direction and are coupled by a coupling element including a coil spring such that, during a percussive driving in of the expansion anchor into a borehole, the coupling element allows pivoting movement in the axial overlap region and a displacement of at least part of the receiving element transversely to the tool direction.

2. The setting tool according to claim 1 wherein the tool adapter, the receiving element and the coupling element are arranged such that the impact force is transmitted directly from the tool adapter to the receiving element.

3. The setting tool according to claim 1 wherein the tool adapter, the receiving element and the coupling element are arranged such that the impact force is transmitted directly from the tool adapter to the anchor rod received in the recess of the receiving element.

4. The setting tool according to claim 3 wherein the receiving element is formed as a sleeve having the recess that is open both in a direction toward the opposite end and in a direction toward the tool adapter.

5. The setting tool according to claim 1 wherein at least one of the tool adapter and the receiving element has a thread onto which the coil spring is screwed.

6. The setting tool according to claim 1 wherein the receiving element includes a retaining element that applies a retaining force oriented in the guide direction and directed toward the drive-side end to the anchor rod received in the recess of the receiving element, the retaining force counteracting removal of the anchor rod in the guide direction from the recess.

7. The setting tool according to claim 6 wherein the retaining element includes at least one magnet that applies the retaining force to the anchor rod being a magnetizable anchor rod.

8. The setting tool according to claim 6 wherein the retaining element includes a clamping element that is elastic at least transversely to the guide direction and reduces a cross section of the recess of the receiving element transversely to the guide direction.

9. The setting tool according to claim 8 wherein the clamping element is formed as a U-shaped bracket having arms inserted into two punctures of the receiving element, the two punctures being positioned opposite one another and aligned transversely to the guide direction.

10. The setting tool according to claim 6 wherein the retaining element includes at least two arms that are elastic transversely to the guide direction and are arranged such that the anchor rod received in the recess of the receiving element pushes the at least two arms outwardly against a tensioning force.

11. The setting tool according to claim 6 wherein the retaining element is an elastic pressing element having a recess extending in the guide direction, wherein an inner diameter of the recess of the pressing element is dimensioned to exert a pressing force transversely to the guide direction on the anchor rod received in the recess of the receiving element.

12. A method for percussively driving an expansion anchor into a borehole, the method comprising the steps of:

providing a driven impact tool;

providing the setting tool according to claim 1 and receiving an expansion anchor in the setting tool; and operating the driven impact tool to drive the expansion anchor into a borehole using the setting tool.

13. The method according to claim 12 including the following steps:

picking up the expansion anchor from a magazine by receiving an anchor rod of the expansion anchor in the setting tool;

positioning the anchor rod in alignment with the borehole;

setting the expansion anchor into the borehole by transmitting an impact force of the driven impact tool to the anchor rod via the setting tool; and removing the setting tool from the anchor rod leaving the expansion anchor in the borehole.

14. The method according to claim 12 including a step of guiding the driven impact tool by a robot.

15. A system for percussively driving an expansion anchor into a borehole in an elevator shaft wall, the system comprising:

a mounting device adapted to be suspended in the elevator shaft;

a robot attached to the mounting device, the robot including a driven impact tool; and the setting tool according to claim 1 inserted into the driven impact tool.

* * * * *